(12) United States Patent
Kaufman et al.

(10) Patent No.: US 7,079,634 B2
(45) Date of Patent: *Jul. 18, 2006

(54) APPARATUS FOR TRACKING CONNECTION OF SERVICE PROVIDER CUSTOMERS VIA CUSTOMER USE PATTERNS

(75) Inventors: David E. Kaufman, Somerset, NJ (US); Qing Liu, Edison, NJ (US); Anna Olecka, Wilmington, DE (US)

(73) Assignee: AT&T Corp., New York, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/731,317

(22) Filed: Dec. 9, 2003

(65) Prior Publication Data

US 2004/0114537 A1 Jun. 17, 2004

Related U.S. Application Data

(63) Continuation of application No. 09/650,634, filed on Aug. 30, 2000, now Pat. No. 6,700,960.

(51) Int. Cl.
*H04M 15/00* (2006.01)

(52) U.S. Cl. .............................. 379/112.01; 379/114.01; 379/114.14; 379/121.03

(58) Field of Classification Search ........... 379/112.01, 379/114.01, 114.08, 114.14, 114.28, 114.29, 379/115.01, 115.02, 116, 119, 120, 121.03, 379/121.04, 127.01–127.06, 200.01, 201.02, 379/133–134; 705/10; 707/6, 7, 10, 206
See application file for complete search history.

(56) References Cited

U.S. PATENT DOCUMENTS

| 6,016,342 | A | 1/2000 | Schwartz |
| 6,185,416 | B1 | 2/2001 | Rudoka et al. |
| 6,298,348 | B1 | 10/2001 | Eldering |
| 6,301,471 | B1 | 10/2001 | Dahm et al. |
| 6,381,315 | B1 | 4/2002 | Nhaissi |
| 6,389,117 | B1 | 5/2002 | Gross et al. |
| 6,483,908 | B1 * | 11/2002 | Kaufman et al. ...... 379/112.01 |
| 6,700,960 | B1 * | 3/2004 | Kaufman et al. ...... 379/112.01 |
| 6,917,940 | B1 * | 7/2005 | Chen et al. .................... 707/10 |

OTHER PUBLICATIONS

David Whitehead Data Warehousing: Winning The Loyalty Game, Telecommunications, vol. 33, Issue 8, S68-S74, http://proquest.umi.com/pqdweb, Aug. 1999.

* cited by examiner

*Primary Examiner*—Quoc Tran

(57) ABSTRACT

A method for identifying tracking accounts belonging to a customer of a service provider using profiles indicating customer patterns of use of the service. The profiles distinguish the account of the service provider customers from each other. Those profiles that substantially match are considered to belong to the same customer.

14 Claims, 5 Drawing Sheets

APPARATUS FOR TRACKING CONNECTION OF SERVICE PROVIDER CUSTOMERS VIA CUSTOMER USE PATTERNS

RELATED APPLICATION

This is a continuation application of U.S. patent application filed Aug. 30, 2000, bearing the Ser. No. 09/650,634 now U.S. Pat. No. 6,700,960, which is hereby incorporated by reference.

TECHNICAL FIELD

The present invention relates to a method and apparatus for obtaining information on service provider customers and, more particularly, to a method and apparatus for tracking customer connection to a service provider using customer profiles indicating customer use patterns.

BACKGROUND OF THE INVENTION

It is not uncommon for a customer of a service provider, such as an Internet service provider or a long-distance telephone service provider, to obtain and maintain multiple accounts, either simultaneously or at different periods of time. Service providers often find it desirable to match such multiple customer accounts with the single customer. This customer identification enables the service provider to ensure continuity in the type of service provided to the customer, to identify highly valued customers and/or to identify less desirable customers or customers with delinquent accounts. Traditional information, such as name and address, are usually used to perform the customer account matching. This method of account matching suffers from certain disadvantages.

More particularly, it is often difficult for the service providers to perform the account matching on their own existing data. Therefore, service providers usually provide account information to outside vendors who are paid to perform matching against their databases. Since the service providers cannot utilize existing data to perform the matching, they must incur the cost of hiring outside vendors to perform the task. In addition, it is often difficult for the outside vendors to match multiple accounts belonging to a single customer using traditional identifying information, since this information is often entered differently for each account and is subject to frequent errors in data entry. In sum, this method for customer account matching is costly, and often inaccurate.

Therefore, a method and apparatus for tracking the connection of customers of a service provider are needed which would enable the service provider to easily and accurately track customer movement or connection. The present invention was developed to accomplish these and other objectives.

SUMMARY OF THE INVENTION

In view of the foregoing, it is a principal object of the present invention to provide a method and apparatus that eliminates the deficiencies of the prior art.

It is a further object of the present invention to provide a method and apparatus for accurately tracking movement and/or connection of service provider customers by accurately matching multiple accounts belonging to a single customer.

It is yet another object of the present invention to provide a method and apparatus for accurately matching multiple accounts belonging to a single customer by identifying customers based upon patterns in customer use of the service.

It is a further object of the present invention to provide a method and apparatus for accurately matching multiple accounts belonging to a single customer by comparing the pattern of use of a particular account with the patterns of use for each of the remaining accounts of the service, and identifying multiple accounts as belonging to a single customer when the pattern of use for the particular account substantially matches the pattern of use of at least one of the remaining accounts.

It is a further object of the present invention to provide a method and apparatus for accurately matching multiple accounts belonging to a single customer by comparing the pattern of use of each account in a first sample of accounts being investigated with the pattern of use for each of the accounts constituting a second sample of accounts of the service provider, and determining that an account in the first sample of accounts and at least one account in the second sample of accounts belong to a single customer when the pattern of use for the account in the first sample of accounts substantially matches the pattern of use of at least one of the accounts in the second sample of customers.

It is a further object of the present invention to provide a method and apparatus for accurately matching multiple accounts belonging to a single customer by comparing the pattern of use of each of the accounts in a first sample of accounts being investigated with the patterns of use for each of the accounts constituting a second sample of accounts of the service provider, where the second sample of accounts constitutes a subset of all of the accounts of the service provider, and determining that an account in the first sample of accounts and at least one account in the second sample of accounts belong to a single customer when the pattern of use of the account substantially matches the pattern of use of at least one of the accounts in the second sample of customers.

It is yet another object of the present invention to provide a method and apparatus for assigning customer history information to multiple accounts belonging to a single customer by comparing the pattern of use of a particular account of the single customer with the pattern of use for the remaining accounts, identifying multiple accounts as belonging to the single customer when the pattern of use for the particular account substantially matches the pattern of use of at least one of the remaining accounts, and assigning the customer history information of the matching remaining account(s) to the particular account.

These and other objects and features of the present invention will be apparent upon consideration of the following detailed description of preferred embodiments thereof, presented in connection with the following drawings in which like reference numerals identify like elements throughout.

DETAILED DESCRIPTION OF THE INVENTION

In order to facilitate the description of the present invention, the invention will be described with respect to the particular example of long-distance telephone service providers. Examples will be described that illustrate particular applications of the invention for long-distance telephone service. The present invention, however, is not limited to any particular service provider nor limited by the examples described herein. Therefore, the description of the embodiment that follows is for purposes of illustration and not limitation.

A particular application of the present invention is identifying customers of a long-distance telephone service provider who have moved without informing the long-distance telephone service provider. The identification is accomplished by matching the customer's pre-move and post-move calling patterns. For example, upon moving, a customer usually notifies their local telephone service provider to disconnect their service and close their account, and reconnect and open another account at the new location. The customer often assumes that their long-distance service provider will be notified and will be able to match their new account with their past history. However, the information provided to the long-distance provider from the local service provider does not distinguish a "mover" from a "new connect". Therefore, the long-distance provider cannot match the new account with the past history of the customer.

Another application of the invention with respect to long-distance telephone service providers is to identify a customer who has opened multiple accounts with different names or where the names have been entered differently by a data entry person (e.g., one account under Joseph Smith and another account under Ellen Smith or one account under Joseph Smith and another account under J. Smith). The present invention solves these and other problems by using customer calling pattern data to match multiple accounts belonging to a single customer.

Figure 1:
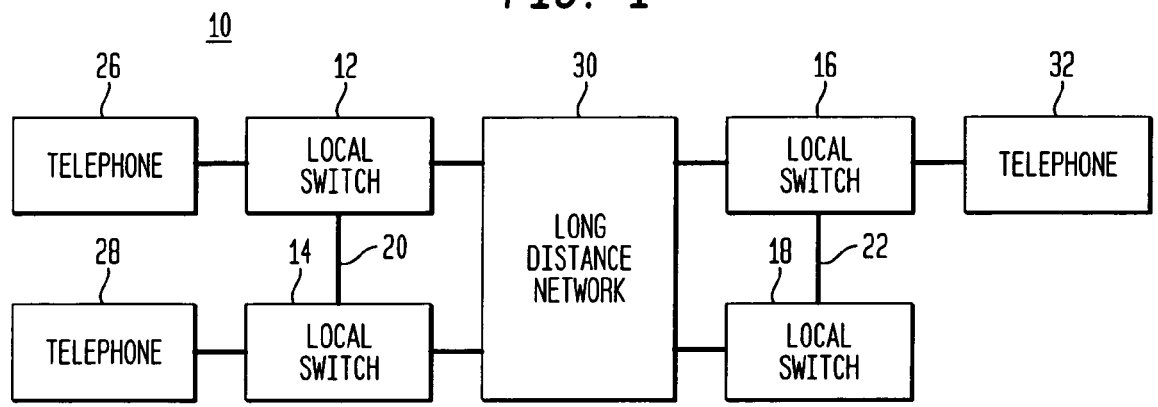
FIG. 1 illustrates an example of a telecommunications system.

Referring to FIG. 1, an exemplary telecommunications network 10 is shown. Local switching offices 12 and 14 are connected to each other by trunk 20, while local switching offices 16 and 18 are connected to each other by trunk 22. Trunk 20 is used to route calls from a telephone 26 served by the local switching office 12 to a telephone 28 serviced by the terminating local switching office 14. Long-distance calls to telephone 32, for example, are processed by a long-distance network 30. Service within local access and transport areas for local calls is often provided by local telephone exchange carriers such as Bell South, and service between the local access and transport areas for long-distance calls is often provided by interexchange carriers such as AT&T.

Figure 2:
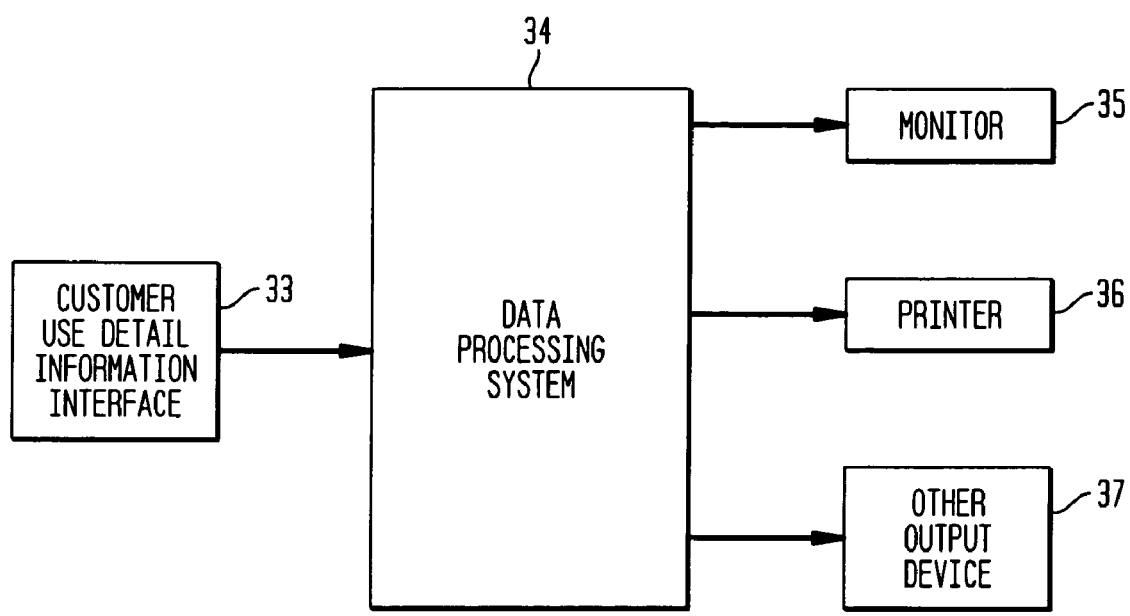
FIG. 2 illustrates the basic elements of a system for performing the method according to the present invention.

FIG. 2 illustrates the basic elements of a system for performing the method according to the present invention. A data processing system 34 receives the customer use detail information for each customer via interface 33. The data processing system 34 uses the use detail information for each customer to generate customer profiles to distinguish customers from one another. The data processing system 34 outputs a profile for each service provider customer based upon service use patterns. In addition, it performs the account comparison step and outputs probable matches based upon the result of the comparison, as well as the overlapping information associated with the probable match. The output from the data processing system 34 may be supplied to a monitor 35, printer 36, and/or other output device 37. The customer use data information may be obtained by any appropriate means utilized by the service provider.

According to the example of the present invention described herein, customers are characterized by the calls they make on the long-distance network 30. The long-distance telephone service provider records call information for billing purposes. This data is recorded at a very low error rate. This data may include the telephone number making the call, the telephone number being called, the time of day, and/or the duration of the call, for example. This existing data may be used as call detail information to determine the call patterns of the service provider customers. The call patterns may then be used to identify multiple accounts belonging to a single customer. Therefore, no outside vendor services are required to perform the present invention.

Figure 3:
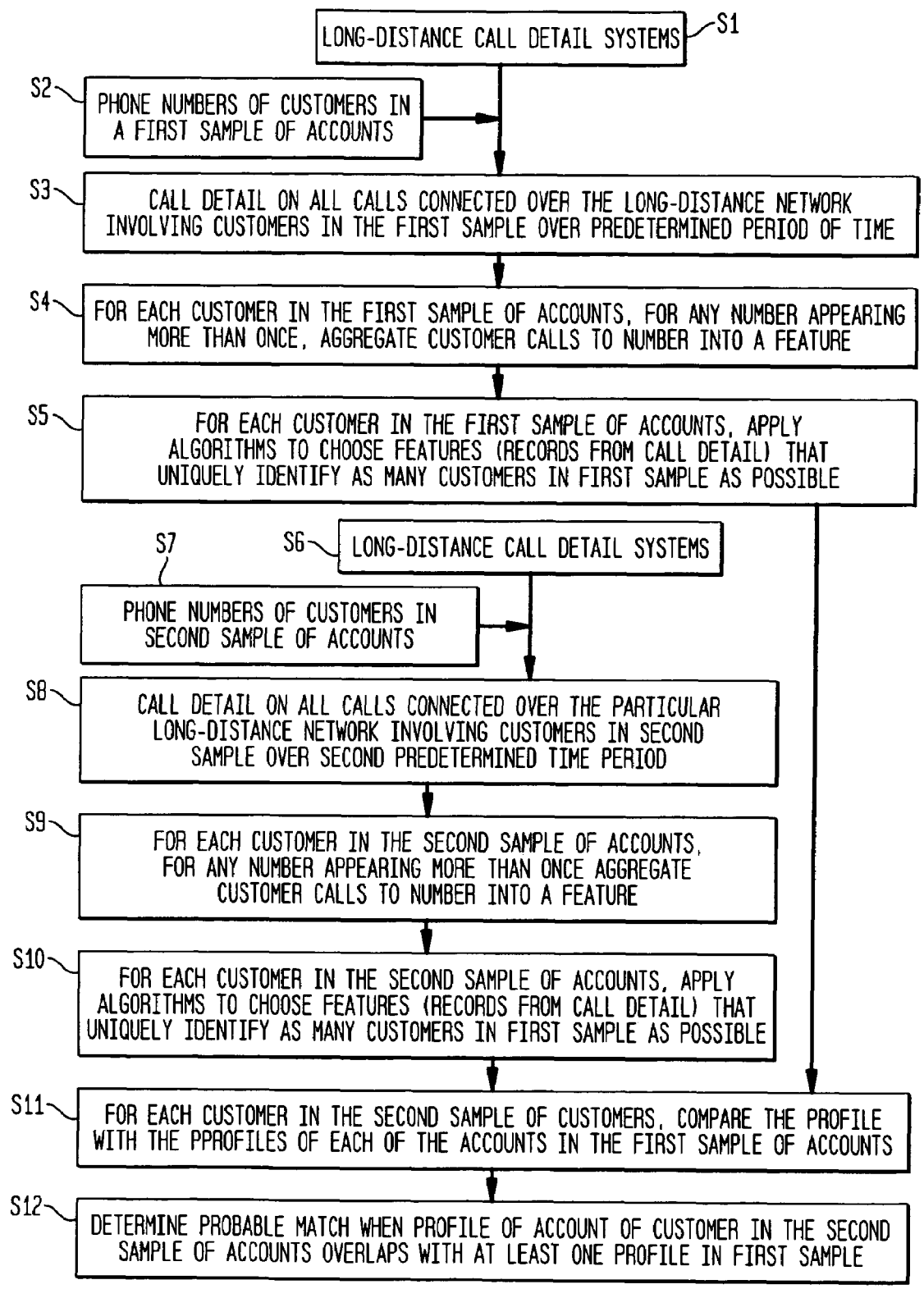
FIG. 3 illustrates a flow diagram of the steps performed in the method according to the present invention.

A customer's calling use is, of course, variable, but the present invention exploits the fact that people tend to call certain numbers (e.g., family) repeatedly over time. By identifying customers or accounts by groups of called numbers, the method according to the present invention is robust to variations in calling pattern over time. The general procedure is described below with reference to FIG. 3.

First, depending on the purpose of the matching, a sample of known customers of interest is identified in steps S1 and S2. The sample may include all of the service provider customers or a subset of the service provider customers. For example, if the service provider is trying to detect when a new account belongs to a high-value customer who recently moved without informing the service provider, the sample consists of high-value customers who disconnected from the service provider at about the same time that a new account(s) was opened. Then, the service provider obtains the list of all calls to or from the customers in the sample over a chosen time period, e.g., one or two months, as shown in step S3. In step S4, the service provider aggregates any customer calls to or from a single number into a "feature." The service provider eliminates from the set of features all calls that are relatively frequent across the sample with respect to an experimentally chosen threshold. For example, if many of the customers in the sample called a major catalog merchant, the merchant's number has little power for distinguishing one customer from another, and it is ignored. The next step is to construct a profile or "fingerprint" for each customer in the sample, i.e., a subset of the features attributed to the customer, so that any two customers in the sample have different profiles (although their profiles may have some features in common), as shown in step S5.

Feature selection and profiling are also performed for each of the accounts being investigated (continuing with the movers example, the set of new accounts connected to the service provider), as shown in steps S6–S10 for identifying customers in a second sample of accounts to be later compared to the first sample in steps S1–S5. The comparison for account matching of the first sample of accounts to the second sample of accounts is performed in step S1 to look for accounts in the two samples that have similar fingerprints. In step S12, probable matches are determined in accordance with the results of the comparison in step S11.

The method according to the present invention is not hindered by minor changes in customer use, because the method does not require identical fingerprints for a match. The matched accounts may not be for the same customer, but they have a relatively high probability of being so, and are cost-effective targets for further investigation, such as by contacting the customer directly.

The method and apparatus according to the present invention provides numerous advantages to the service provider. More specifically, the information obtained by the matching method and apparatus may be used to provide continuity of service to customers and to identify high-value customers. In addition, the information may be used to screen new accounts for creditworthiness. If a new customer's call pattern matches an old account with a history of delinquency or fraud, the service provider would have the opportunity to restrict the new account, avoiding the generation of new uncollectible debt. The service provider may also use the information to pursue collection of an old account's debt, gaining revenue that would otherwise be lost.

A more detailed description of the method and apparatus according to the present invention as implemented in the telecommunications example is set forth below.

Phase I. Profiling Customers

A long-distance customer's calling activity includes a sequence of inbound and outbound calls. Those calls have a number of attributes, such as duration, time of day, time of week, etc. If a customer's calling activity is observed over some time window, additional attributes can be derived. Derived attributes may include frequency of calls made by the customer to a particular number, average talk time, total talk time, etc. It will be appreciated by those of ordinary skill in the art that many different attributes and derived attributes are possible.

Figure 4:
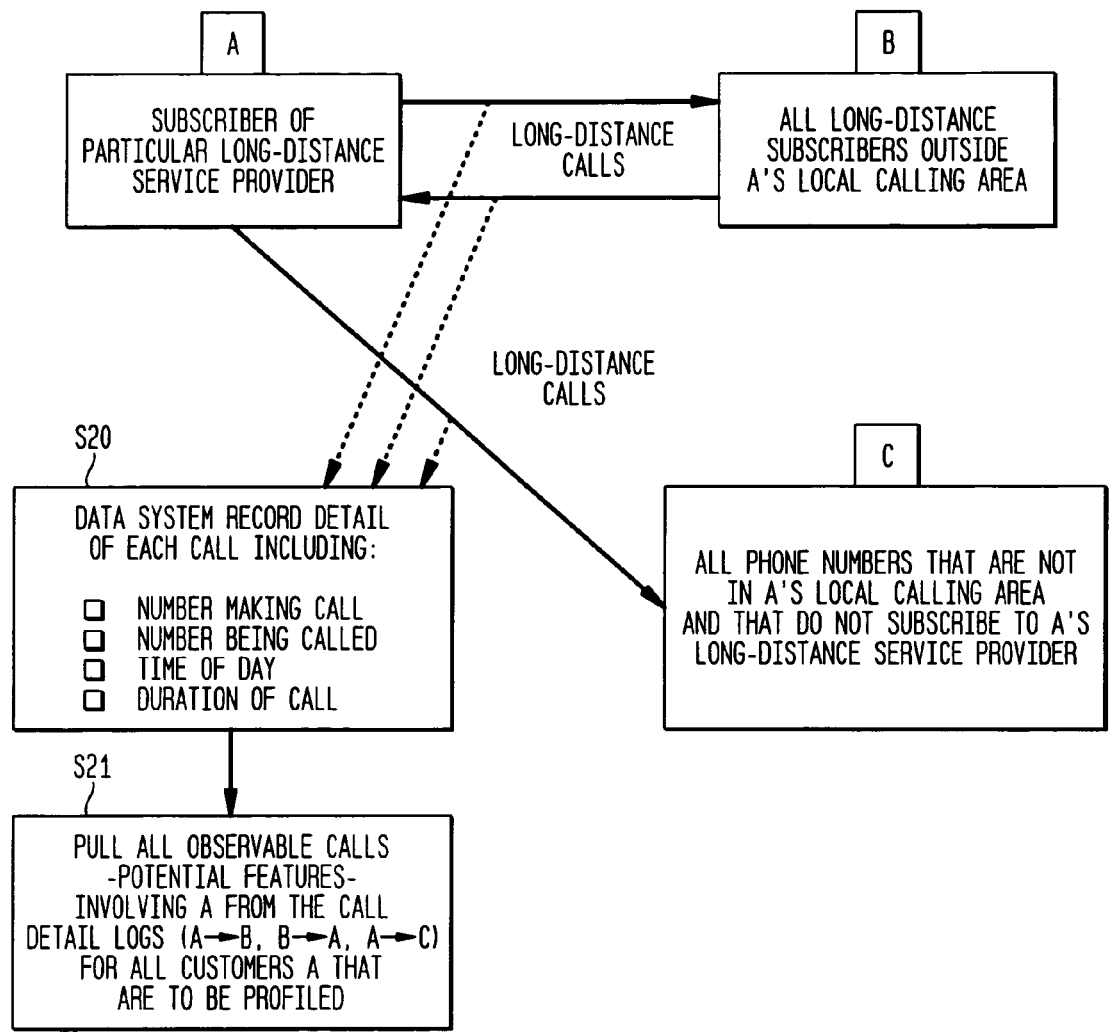
FIG. 4 illustrates an example of customers of a service provider and the information obtained from the customers for performing the method according to the present invention.

In the example illustrated in FIG. 4, customers A and B are subscribers of a particular long-distance telephone service provider. Customer C is not a subscriber to the particular long-distance provider. Assume that customer A is a member of a first sample of customers representing the customers to be investigated. The first sample may be a subset of all of the service provider customers. For example, assume that the first sample of customers includes high value customers who disconnected from the service provider around the time that a new connection(s) occurred. Also assume that the profiles of the customers in this sample, including the profile of customer A, will be matched or compared against the profiles of the service provider customers constituting a second sample of customers. In the present example, assume that the second sample represents new account(s) of the service provider.

In order to create a profile for customer A, customer A's call pattern for some period of time is monitored. The period of time may be selected by the service provider and need only be long enough to observe a calling pattern. Step S20 in FIG. 4 illustrates the step of recording information for each of customer A's calls. In the current example, the information recorded for customer A includes the number making the call, the number being called, the time of day, and the duration of the call. Of course, the recorded information may include more or less information or different information than that shown in the example of FIG. 4.

A profile for customer A is generated from the recorded information, as shown in step S21. More particularly, for each of customer A's calls, the call's frequency within the period of time may be determined. In addition, each call may be distinguished as either an inbound call or an outbound call. In this framework, customer A's call detail may be defined by a set of features (phone numbers), each determined uniquely by a number called and a direction (inbound/outbound). More formally, a feature of customer A may be defined to be the pair:

$$f=(c, \text{I/O indicator})$$

where $f=$ a feature (Billed Telephone Number (BTN)); c=number (BTN) called by A (outbound call) or the number (BTN) which called A (inbound call); and the I/O indicator=1 for inbound calls or 0 for outbound calls. Also, let the frequency $\phi_{Af}$ be the ratio of calls A made (received) to (from) c relative to all calls A made (received).

Customer A is identified by its BTN. Calls c are identified by their BTNs as well. If an outbound call is made by A to c, c doesn't even have to be a customer of the service provider. For example, in FIG. 4, customer A may place a call to customer C, who is not a customer of the particular service provider (i.e., customers A and C subscribe to different long-distance telephone service providers). All calls passing through A's service provider's network are observed. Therefore, the data for creating the customer profile will include all calls made by customer A, even if the recipient is not a customer of the service provider. The reverse is not true, however, because a call from a non-subscriber may reach customer A without touching the service provider network to which customer A subscribes. Therefore, for inbound calls, only calls coming from the customers of the service provider to which A subscribes are observed. In FIG. 4, this means that only calls from customer B to customer A are observed, as shown in Step S21. The steps shown in FIG. 4 correspond to steps S1–S4 in FIG. 3.

The list of features of customer A can be large, consisting of all calls that "touched" customer A in the given time window. Some of those calls may be incidental, while some may be part of a consistent pattern specific to customer A. The goal of profiling is to substantially reduce the number of features to be included in customer A's profile, and still be able to differentiate between customer A and all other customers in the sample. Therefore, features that are incidental may be eliminated. This may be accomplished by selecting a frequency threshold $\tau_f$ and including feature f in the list of features for customer A only if the frequency $\phi_{Af}$ exceeds the frequency threshold $\tau_f$. In calculating the threshold $\tau_f$, only calls to/from customers in the sample of profiled customers are considered. Therefore $\tau_f$ is based on the sample data. The threshold can be selected based upon experience of the service provider, on experiments performed by the service provider or based on training. The threshold varies depending upon the service provider and on the needs of the service provider. Therefore, any suitable method for selecting the threshold may be used. The goal is to create a calling profile or "fingerprint" for customer A, as shown in step S5 in FIG. 3, such that:

(i) the profile allows the service provider to distinguish customer A from all the other customers in the sample;

(ii) the profile consists of as few features as possible;

(iii) the features in the profile either are unique to customer A or appear on the feature list of as few other customers as possible; and (iv) the features in the profile are with high probability a part of customer A's typical pattern.

Step (iv) can be accomplished by limiting feature inclusion with appropriate thresholds on $\phi_{Af}$, while steps (i), (ii) and (iii) can be accomplished with an integer optimization model of set covering, as discussed below.

Set Covering Problem According to a First Embodiment

For any set S, let |S| represent the number of members of S. Let the set $\Omega$ be the first sample of customers, with $|\Omega|=m+1$. Let $A \in \Omega$ be a customer to be profiled, and let $F_A$ be the list of all features f of customer A whose frequencies $\phi_{Af}$ pass their associated thresholds $\tau_f$. Let $n=|F_A|$. Consider customer $B \in \Omega$, $B \neq A$. Customer A's pattern is determined to differ significantly from customer B's with respect to feature f if one of the two passes threshold $\tau_f$ and the other does not, i.e., $A \neq_f B$ if and only if $\phi_{Af} > \tau_f$ and $\phi_{Bf} \leq \tau_f$ (or vice versa).

For every feature f from the list $F_A$, create a set $S_f=\{B: \phi_{Bf} \leq \tau_f\}$. $S_f$ is the subset of $\Omega$ such that $B \in S_f$ if and only if $A \neq_f B$. Then $\cup S_f$ is the set of all customers in $\Omega$ that differ significantly from customer A on at least one feature. Assume that $\cup S_f = \Omega \backslash A$; that is, no customer other than customer A has a list of features identical with customer A. It follows, that $|\cup S_f|=m$. The problem of minimizing the number of features used to distinguish customer A can be formulated as minimizing the number of sets $S_f$ needed to cover $\Omega \backslash A$, as follows:

Let $a_{Bf}=1$ if $B \in S_f$, and 0 otherwise.
Let $x_f=1$ if f is selected, and 0 otherwise.

minimize $$\sum_{f=1}^{n} x_f$$

subject to $$\sum_{f=1}^{n} a_{Bf} x_f \geq 1$$

for B=1, ..., m and $x_f=0$ or 1 for $f \in F_A$.

Given the optimal solution x*, cover $F^*=\{f: x_f^*=1\}$ provides a minimal set of features establishing customer A as distinctly different from each customer B in the sample to be investigated. This integer program is an example of the set covering problem.

Greedy Algorithm

The set covering problem can be solved for each customer. When there are a large number of customers (e.g., 1.5 million) disconnecting each month, computational efficiency is essential, so a global optimum may not be sought. The set covering problem can be efficiently solved by a greedy heuristic as follows:

---
Step 0: $F^* = \emptyset$; $\Omega^* = \Omega \backslash A$.
Step 1: Select f such that $|S_f| = \max\{ |S_j| : j \in FA \backslash F^*\}$
Step 2: $F^* = F^* \cup \{f\}$; $S_j = S_j \backslash S_f$ for all $j \in FA \backslash F^*$; $\Omega^* = \Omega^* \backslash S_f$;
Step 3: If $\Omega^* = \emptyset$, STOP and output cover $F^*$. Otherwise, go to Step 1.
---

Generalized Set Covering Problem According to the Second Embodiment

According to this embodiment, a generalized set covering problem is used to accomplish steps (i), (ii) and (iii), noted above with respect to profiling or fingerprinting. The generalized set covering formulation looks for a cover in which every element is covered k times (belongs to at least k sets). k may be defined as the depth of the cover. This model may be more appropriate for obtaining a robust profile, so that a customer whose call pattern changes to some degree following a move can still be recognized. Multi-covering allows selection of more features than a regular set covering. In addition, different customers can be covered to different depths when appropriate. For example, it may be desirable to cover customer $B_1$, who has a large number of features, more times than customer $B_2$, whose list of features is much smaller.

For each customer B, let $k_B$ be the desired depth of coverage. Then the multicover formulation is as follows:

minimize $$\sum_{f=1}^{n} x_f$$

subject to $$\sum_{f=1}^{n} a_{Bf} x_f \geq k_B$$

for B=1, ..., m and $x_f=0$ or 1 for $f \in F_A$

Cover $F^*=\{f: x_f=1\}$ provides a minimal set of features establishing customer A as distinct from each customer B in the sample to be profiled at the level of coverage desired for robustness.

---
Modified Greedy Algorithm:

Step 0: $F^* = \emptyset$; $\Omega^* = \Omega \backslash A$
Step 1: Select f such that $|S_f| = \max \{|S_j| : j \in FA \backslash F^*\}$
Step 2: $F^* = F^* \cup \{f\}$
Step 3: For all $B \in S_f$:
    $k_B = k_B - 1$;
    if $k_B = 0$, $\Omega^* = \Omega^* \backslash B$ and $S_j=S_j \backslash B$ for all $j \in F_A \backslash F^*$
Step 4: If $\Omega^* = \emptyset$, STOP and output cover $F^*$
    If $F^* = F_A$, STOP; no cover of depth k exists.
    Otherwise, go to Step 1.
---

Figure 5:
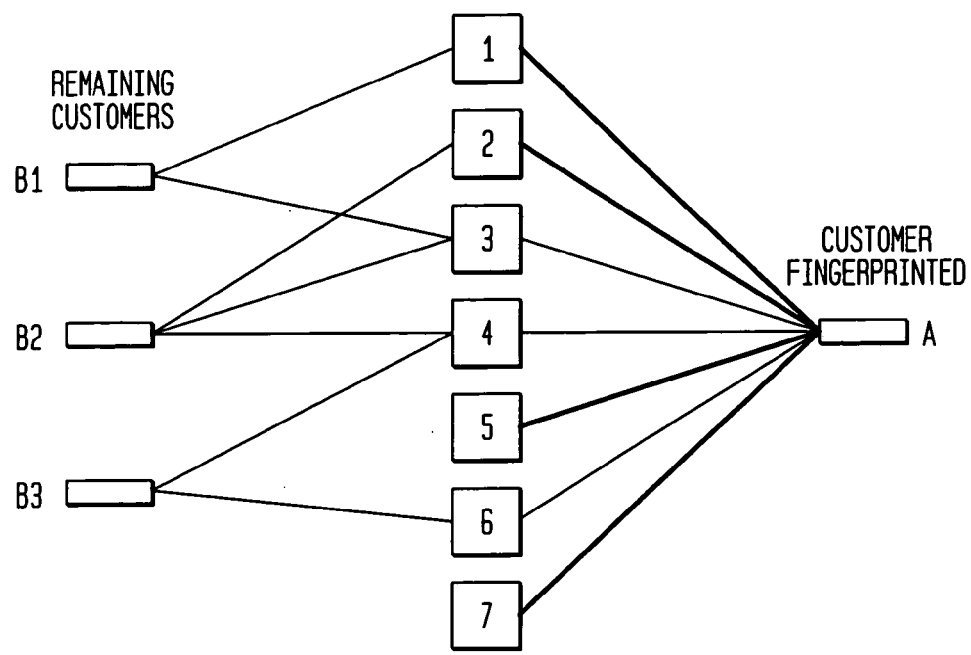
FIG. 5 illustrates an example of how one customer account is distinguished from the remaining customer accounts in a sample according to the present invention.

In FIG. 5, a feature f is shown with a line connecting it to a member of the sample (A, B1, B2, B3) only if f passes the threshold for that member. Customer A, the customer being profiled, is connected to all of the features. Thus, customer B1 can be covered, for example, once by choosing any feature that has no connecting line to B1. In the fingerprint of customer A pictured in FIG. 5, coverage for each of the customers B1, B2, B3 is at depth 3. The greedy algorithm may first include in the profile the two features (5 and 7) that are unique to customer A. This gives each of customers B1, B2, and B3 coverage of depth 2. Next, feature 1 may be included in the profile. It covers customers B2 and B3, which now have coverage of depth 3. Finally, feature 2 is included, which covers customers B1 and B3. Now the depth of coverage for customers B1 and B2 equals 3, while the depth of coverage for customer B3 equals 4. In this example, customer A has a fingerprint of size 4 (marked by thicker lines).

Figure 6:
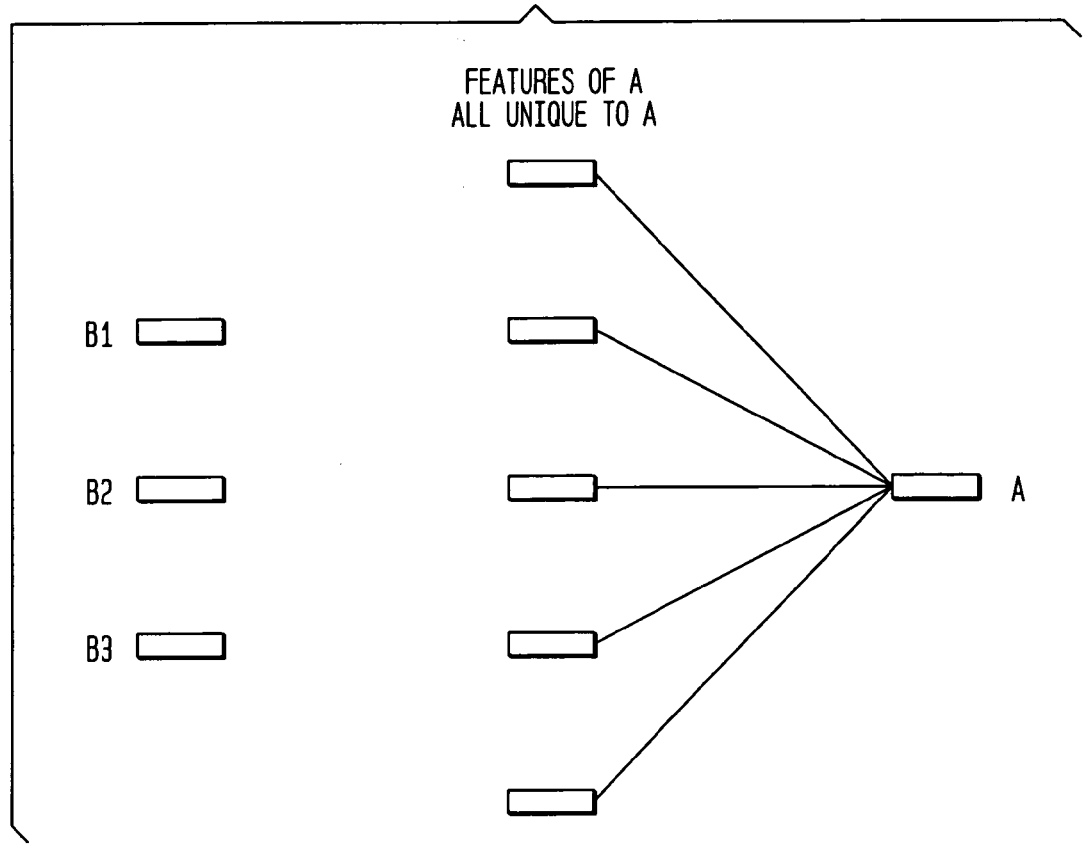
FIG. 6 illustrates another example of how of how one customer account is distinguished from the remaining customer accounts in a sample according to the present invention.

If a customer being fingerprinted has at least K unique features (that is, features which do not appear in the call detail of the remaining customers in the sample being profiled) and $K \geq \max_B\{k_B\}$, then the set covering model may not be necessary, because a collection of K unique features can be used for a profile. In the example pictured in FIG. 6, the fingerprint of customer A consists of 5 features, all of which are unique to customer A. Customers B1, B2, B3 are all covered at the depth of 5. This saves computing time by applying the set covering algorithm only in cases where there are not enough unique features.

The customer profile should be stable to be of use. In the present example, the customer profile may be considered as stable if, for example, a fingerprint including at least 5 features can be found in each month, and either at least 30% of the features remain unchanged from month to month or at least three features remain unchanged from month to month. However, the stability of a fingerprint can be defined as appropriate for the particular service provider.

Phase II: Matching Customers to Profiles

Referring again to FIG. 3, in steps S1 and S2, the phone numbers of customers to be profiled, such as customer A in FIG. 4, are determined. In step S3, call details of calls over the service provider network involving these customers are determined over a predetermined period of time. In step S4, calls for a particular number appearing more than once are aggregated into a feature, and in step S5 the appropriate algorithms, as discussed above, are applied to choose features that uniquely identify as many customers as possible of the customers to be profiled. In steps S6 and S7, the phone numbers of customers to be recognized or new connect customers are determined. In step S8, the call details of calls over the service provider network involving new connect customers are determined over a predetermined period of time. This predetermined period of may be the same, less than or more than the time period in step S3. In step S9, calls for one number are aggregated into a feature, and in step S10, the appropriate algorithms, as discussed above, are applied to choose features that uniquely identify as many customers in this group as possible. In step S11, the profiles of the customers from the second sample of customers being investigated are compared with the profiles of the first sample of customers, including customers A and B. When a profile in one group overlaps a profile in the other group, it is determined that there is a strong possibility of a match in step S12, indicating that the profiles correspond to accounts belonging to the same customer. The service provider may act on results indicating a strong possibility of a match by further investigating the particular accounts and possibly contacting the customer directly.

According to the present invention, as described above with respect to the example of a telecommunications system and a long-distance telephone service provider, multiple accounts belonging to a single customer may be easily and accurately determined by the service provider. Therefore, according to the present invention, accurate results can be obtained without requiring the services of an outside vendor.

While particular embodiments of the invention have been shown and described, it is recognized that various modifications thereof will occur to those skilled in the art without departing from the spirit and scope of the invention.

We claim:

1. A method for tracking telecommunication customers comprising:
    employing a set of call detail information records to create a set of features for each putative customer in said set, where each putative customer is identified by one or more attributes, and where feature in said set relates to calls made by said putative customer to an identified telephone number, or made by said identified telephone number to said putative customer; and
    analyzing said set of features to identify two of putative customers with calling patterns that indicate, with a probability in excess of a preselected threshold, that the putative customers are in reality a single customer.

2. The method of claim 1 where said set is composed of two sets, from two different time intervals.

3. The method of claim 1 were said feature is an aggregate of calls made by said customer to a number, or an aggregate of calls made by said customer by said number.

4. The method of claim 1 where said set of features is a set that corresponds to information on all calls made by said customer, or all calls made to said customer, reduced by discarding calls that fail to meet a predetermined usefulness threshold.

5. The method of claim 4 where said step of analyzing employs an algorithm for solving a set covering problem.

6. The method of claim 4 where said step of analyzing considers, in analyzing the features of each customer, only those features that are necessary to distinguish said customer from other customers.

7. A method for tracking telecommunication customers comprising:
    employing a first set of call detail information records to create a set of features for each customer in said set, where each customer is identified by one or more attributes, and where feature in said set relates to calls made by said customer to an identified telephone number, or made by said identified telephone number to said customer;
    employing a second set of call detail information records to create a set of features for each customer in said set, where each customer is identified by one or more attributes, and where feature in said set relates to calls made by said customer to an identified telephone number, or made by said identified telephone number to said customer;
    analyzing said set of features created from said first set and from said second set to associate customers in said first set with customers in said second set, where a customer in said first set is associated with a customer in said second set when a calling pattern of said customer in said first set, as evidenced by said features of said customer in said first set, and a calling pattern of said customer in said second set, as evidenced by said features of said customer in said second set indicate, with a probability in excess of a preselected value, that said customer in said first set and said customer in said second set are one and the same customer.

8. The method of claim 7 were said feature is an aggregate of calls made by said customer to a number, or an aggregate of calls made by said customer by said number.

9. The method of claim 8 where, in connection with each of said features, frequency of calls is considered.

10. The method of claim 8 where, in connection with each of said features, number of calls is considered.

11. The method of claim 8 where, in connection with each of said features, duration of calls is considered.

12. The method of claim 7 where said set of features is a set that corresponds to information on all calls made by said customer, or all calls made to said customer, reduced by discarding calls that fail to meet a predetermined usefulness threshold.

13. The method of claim 12 where said step of analyzing employs an algorithm for solving a set covering problem.

14. The method of claim 12 where said step of analyzing considers, in analyzing the features of each customer, only those features that are necessary to distinguish said customer from other customers.

* * * * *